US011351570B2

(12) United States Patent
Gereige et al.

(10) Patent No.: US 11,351,570 B2
(45) Date of Patent: Jun. 7, 2022

(54) APPARATUS FOR COATING DUST PARTICLES UNIFORMLY ON FLAT SURFACES FOR ACCELERATED TESTING

(71) Applicant: Saudi Arabian Oil Company, Dhahran (SA)

(72) Inventors: Issam Gereige, Thuwal (SA); Ahmad Khayyat, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 113 days.

(21) Appl. No.: 16/936,154

(22) Filed: Jul. 22, 2020

(65) Prior Publication Data

US 2022/0023911 A1    Jan. 27, 2022

(51) Int. Cl.
  *B05D 1/30* (2006.01)
  *B05C 19/04* (2006.01)
  *B05C 11/10* (2006.01)
  *H02S 50/10* (2014.01)

(52) U.S. Cl.
  CPC .......... *B05C 19/04* (2013.01); *B05C 11/1005* (2013.01); *B05D 1/30* (2013.01); *H02S 50/10* (2014.12)

(58) Field of Classification Search
  None
  See application file for complete search history.

(56) References Cited

U.S. PATENT DOCUMENTS

| | | | |
|---|---|---|---|
| 9,461,185 B2 | 10/2016 | Nair et al. | |
| 9,732,986 B2 | 8/2017 | Al-Ansary et al. | |
| 10,297,698 B2 | 5/2019 | Chu et al. | |
| 2013/0068217 A1* | 3/2013 | Al-Ansary | F24S 70/30 126/680 |
| 2016/0035912 A1 | 2/2016 | Nair et al. | |
| 2018/0212076 A1 | 7/2018 | Chu et al. | |
| 2020/0002828 A1 | 1/2020 | Mills | |

FOREIGN PATENT DOCUMENTS

CN    109211532        1/2019
CN    109211532 A  *  1/2019

OTHER PUBLICATIONS

Henderson, solamovus.com [online], "Desert Sand + Gravity: The secret to more efficient concentrated solar power," Jan. 2016, retrieved Oct. 12, 2020, retrieved from URL <https://www.solamovus.com/desert-sand-gravity-the-secret-tomore-efficient-concentrated-solar-power N9619.html> , 5 pages.
Abdallah et al., "Soiling loss rate measurements of photovoltaic modules in a hot and humid desert environment," Journal of Solar Energy Engineering, May 2020, Abstract only, 2 pages.
PCT International Search Report and Written Opinion in International Appln. No. PCT/US2021/042598, dated Nov. 2, 2021, 13 pages.

* cited by examiner

*Primary Examiner* — Alexander M Weddle
(74) *Attorney, Agent, or Firm* — Fish & Richardson P.C.

(57)    ABSTRACT

The present disclosure describes a system including: at least one ceramic foam comprising a porous top surface, porous channels, and a porous bottom surface, wherein the at least one ceramic foam is over a surface of a solar panel such that when dust particles are poured onto the porous top surface of the at least one ceramic foam, the dust particles permeate through the porous channels of the at least one ceramic foam and then exit from the porous bottom surface of the at least one ceramic foam to form a layer of dust, with a predetermined thickness, on the surface of the solar panel.

20 Claims, 3 Drawing Sheets

APPARATUS FOR COATING DUST PARTICLES UNIFORMLY ON FLAT SURFACES FOR ACCELERATED TESTING

TECHNICAL FIELD

This disclosure generally relates to the soiling of solar panels.

BACKGROUND

Soiling on photovoltaic (PV) systems can have a significant impact of the performance of the photovoltaic system. For example, the dust deposited on the surface of the PV module can block the incoming light from reaching the solar cell, thus reducing the power output of the system.

SUMMARY

In one aspect, the present disclosure describes a system that includes at least one ceramic foam comprising a porous top surface, porous channels, and a porous bottom surface, wherein the at least one ceramic foam is over a surface of a solar panel such that when dust particles are poured onto the porous top surface of the at least one ceramic foam, the dust particles permeate through the porous channels of the at least one ceramic foam and then exit from the porous bottom surface of the at least one ceramic foam to form a layer of dust, with a pre-determined thickness, on the surface of the solar panel.

Implementations may include one or more of the following features.

The porous channels may be sized to have a diameter from about 2 mm to about 6 mm, and the pre-determined thickness may be from about 20 micron to 500 micron. The surface of the solar panel may include at least one of: a flat area, a curved area, or a mirror. The system may further include a stage that is motorized. The stage may be configured to transport the at least one ceramic foam over the solar panel to deposit the dust particles over the surface of the solar panel. The stage may be configured to transport the solar panel under the at least one ceramic foam such that the dust particles are deposited over the surface of the solar panel.

The at least one ceramic foam may include metal-oxides. The at least one ceramic foam may further include at least one porous side surface. The system may further include a shield surrounding the at least one porous side surface. The system may further include: at least one funnel structure arranged above the top porous surface of the ceramic foam, wherein the at least one funnel structure comprises at least one nozzle configured to pour the dust particles over the top porous surface of the ceramic foam. The system may further include a closed chamber that houses the solar panel, wherein the closed chamber is configured to control a temperature condition, a humidity condition, and a wind condition surrounding the solar panel.

In another aspect, the present disclosure describes a computer-implemented method that includes: driving a stage to cause at least one ceramic foam over a surface of a solar panel, wherein the at least one ceramic foam comprise a porous top surface, porous channels, and a porous bottom surface; and causing dust particles to be poured on the porous top surface of the at least one ceramic foam such that the dust particles permeate through the porous channels of the at least one ceramic foam and then exit from the porous bottom surface of the at least one ceramic foam to form a layer of dust, with a pre-determined thickness, on the surface of the solar panel.

Implementations may include one or more of the following features.

The porous channels may be sized to have a diameter from about 2 mm to about 6 mm, and the pre-determined thickness may be from about 20 micron to 500 micron. The method may further include: using a feedback loop to control a thickness of the layer of dust being deposited. The surface of the solar panel may include at least one of: a flat area, a curved area, and a mirror.

Driving the stage may include: transporting the at least one ceramic foam over the solar panel to deposit the dust particles over the surface of the solar panel. Driving the stage may include: transporting the solar panel under the at least one ceramic foam such that the dust particles are deposited over the surface of the solar panel. The method may further include: using a feedback loop to control a temperature condition surrounding the solar panel. The method may further include: using a feedback loop to control a humidity condition surrounding the solar panel. The method may further include: using a feedback loop to control a wind condition surrounding the solar panel.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to a tool to investigate soiling conditions that have a significant impact on the performance of photovoltaic (PV) systems. Indeed, the dust deposited on the surface of PV modules blocks the incoming light from reaching the solar cell, thus reducing the power output of the PV system. The yield loss due to soiling is commonly used to predict the cleaning frequency of photovoltaic systems. Experiments performed outdoor may represent the effect under real environmental conditions. These experiments, however, tend to require a long time (for example, weeks to several months) to study the impact of dust as a function of, for example, dust thickness. In comparison, approaches for conducting the experiments indoor, for example, experiments capable of coating dust particles in a uniform and controlled way on any type of surface, may facilitate the investigation of the effect of soiling conditions on the performance of PV systems. Indeed, some implementations described in the present disclosure incorporate the use of a porous material block to control the flow rate and deposition of solid dust particles. These experiments can thus stimulate variable conditions of soiling indoor and in an expedited manner.

Soiling of solar panels is one of the major challenges during operation and maintenance of photovoltaic power plants. This issue can become more pronounced in desert-like environment where the solar radiation is strong and conditions are otherwise favorable for deploying solar power plants. Soiling reduces the power output of solar systems and negatively impacts the unit production cost of electricity. To assess the long-term degradation due to soiling, including other meteorological parameters such as temperature and humidity, accelerated testing that can simulate the joint effect of these environmental factors on the performance of PV systems would be highly advantageous. Outdoor experiments, however, often entail a long duration (for example, weeks to months) to estimate the short-term (for example, intra-day) and long-term (for example, daily/weekly/monthly performance) yield loss due to soiling. For indoor accelerated testing, the environmental parameters should be reproduced, as much as possible. Although temperature and humidity may be reproduced indoor, artificial deposition of dust on flat surfaces in a uniform and controllable way remain challenging. Some implementations described by the present disclosure can simulate all environmental parameters, including artificial deposition of dust on flat surfaces in a uniform and controllable manner.

Figure 1:
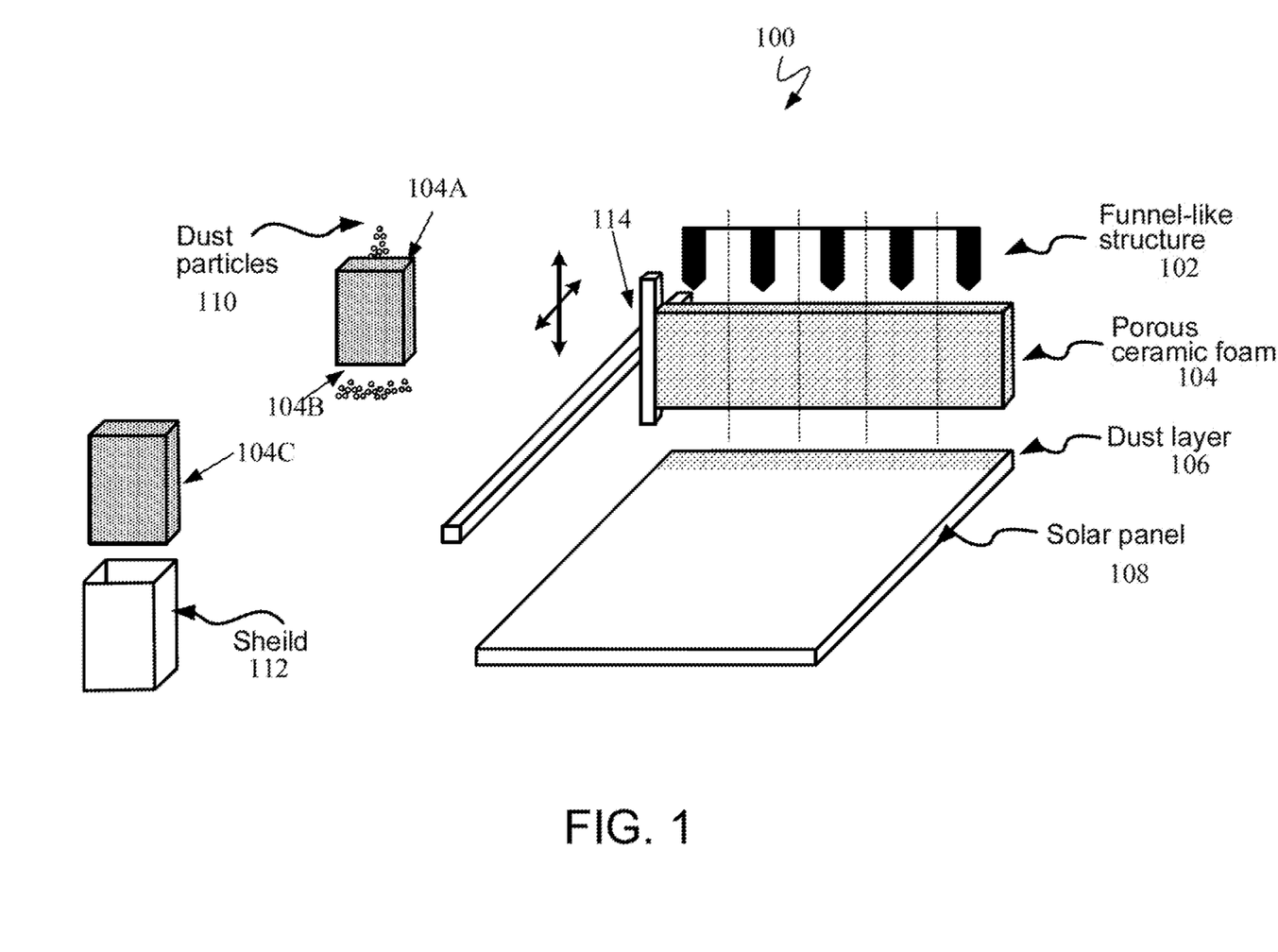
FIG. 1 shows a diagram illustrating an example of a configuration according to an implementation of the present disclosure.

FIG. 1 illustrates a diagram 100 for controlled dust deposition on flat surfaces of PV panels to simulate soiling conditions. Solar panel 108 can be laid flat, for example, on a table. In some cases, solar panel 108 may be placed at a slanted angle with respect to the ground to simulate an actual placement in the field. A 2-D motor 114 can drive a stage on which porous ceramic foam 104 is mounted. Porous ceramic foam 104 can be made using different types of low-cost materials (e.g. metal-oxides or others). Porous ceramic foam 104 can serve as an intermediate medium for gravimetric deposition of dust particles. The dust particles 110 are poured, manually or automatically, on top of the foam. As illustrated, the dust particulates can be poured through funnel-like structures 102, which can provide, for example, an array of nozzles over porous ceramic foam 104. The ceramic foam 104 has a top porous surface 104A and a bottom porous surface 104B. The ceramic foam 104 has porous channels inside. The ceramic foam structure can be shielded on the sides (104C) of the ceramic foam 104 to avoid dust overflowing through pores on the sides (104C). As illustrated, shield 112 can enclose porous ceramic foam 104. After travelling through the porous ceramic foam 104, the particles exit from the bottom to form a deposit a dust layer 106 with, for example, a uniform distribution of thickness. The porous ceramic foam 104 allows the dust particles 110 to settle on a variety of surfaces in a uniform and controlled way. Porosity dimension of the foam can depend on the type of dust particles that is used. Dust particles can range from 1 micrometer to several hundreds of micrometers because dust particles may differ from an area to another. Dimension of the porous channels is generally on the millimeter scale, which can range from 2 mm to 6 mm.

To coat large areas, either the solar panel 108 is moved and the porous ceramic foam 104 is fixed, or the porous ceramic foam 104 is fixed on a two-axis motor with controllable speed and the solar panel 108 is fixed. In either scenarios, the 2-D motor 114 can drive the moving part.

The deposition can also be done on curved surfaces or mirrors, as found in concentrated solar power systems. The deposition can be done under controlled temperature and humidity environment. A closed chamber can be built around the setup to control the humidity while maintaining the sample at a fixed temperature. The chamber can include air blowing to simulate the wind conditions.

Solutions for coating dust in indoor experimental setup may use dry or wet spray coating. Using the dry spray approach, dust particles are sprayed as received. Using the wet spray approach, the dust is dispersed in low boiling solvent. Both approaches suffer from non-uniformity and do not mimic the gravimetric deposition of dust that occurs naturally in outdoor conditions. In fact, wet spray does not reproduce the same outdoor conditions and does not yield a desired uniformity. In addition, to achieve higher thickness, more spraying cycles are needed. However, the second (and subsequent) spraying cycle can wet the surface again, which makes it very difficult, if not infeasible, to control the thickness.

The advantage of implementations described by the current disclosure is the ability to deposit the particles uniformly on the surface and, if needed control the humidity during or after the deposition process to mimic the outdoor wet/dry conditions. For the thickness, it is also advantageous to refer to the "number of layers" while benchmarking the associated energy loss. The thickness of one layer can be in the range of 20-500 microns. For context, the solar panel can be in an inclined position in which the thickness reaches a limit after several layer as the dust particles tend to migrate downwards in the field. As a result, a solar panel in the field can experience thickness variation in the soiling condition. Implementations described in the present disclosure can simulate the thickness gradient by virtue of controllable and programmable deposition speed and thickness. Indeed, the implementations can overcome the challenges encountered when mimicking the dust deposition in indoor conditions to study the impact on photovoltaic module power output. In other words, implementations described by the present disclosure can be used indoor to mimic the conditions, for example, dust deposition, that occur outdoor and can reproduce in a very short time what happened outdoor over weeks or even months.

Figure 2:
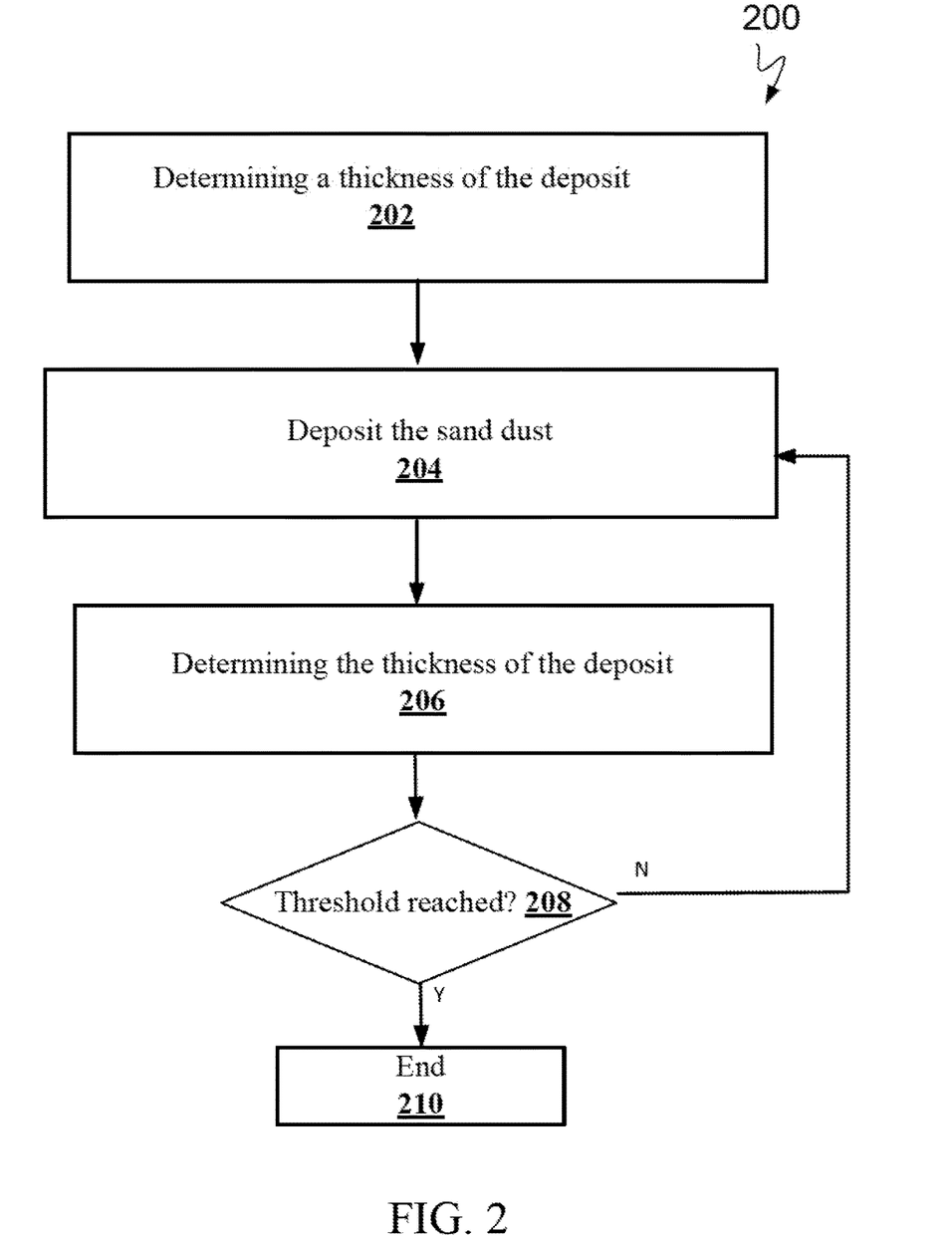
FIG. 2 shows a flow chart illustrating an example of a process according to an implementation of the present disclosure.

FIG. 2 illustrates a flow chart 200 to illustrate an example of a process in accordance with some implementations of the present disclosure. The process can be implemented by a computer and can control related components such as the 2-D motor 114 and porous ceramic foam from FIG. 1, as well as thickness gauge, temperate meter and humidity meter. The process may initially determine a thickness of the dust layer to be deposit (202). This thickness determination may factor in temperature and humidity so that a holistic simulation becomes feasible.

The process may then proceed to deposit the sand dust (204). As discussed above in association with FIG. 1, a porous ceramic foam can be mounted on a motor-driven stage and sand can be poured through a funnel structure to permeate and pass through the porous ceramic foam and then drop on the surface of a solar panel at a particular location. The deposit speed can be controlled by, for example, the size and density of the porous-channels of the porous ceramic foam. A computer can drive the stage to traverse the intended surface area of a solar panel. In some cases, the computer can estimate the dwell time at each location for the deposit process to accumulate the desired thickness. In these cases, the computer can drive the stage like printing a pattern on the surface of the solar panel. In these cases, the computer can also drive the stage in one direction, for example, the column direction when the porous ceramic foam is wide enough provide sufficient coverage in the row direction.

The process may then proceed to determine the thickness of the deposit (206). In some cases, a thickness gauge involving an optical device such as a camera, or mirror, can be used to measure the thickness of the sand dust. In other cases, when the deposit speed is generally known, the layer thickness may be determined from the dwell time incurred at a particular location.

The process may then determine whether the thickness has reached, for example, a pre-determined threshold (208). The deposit process using the porous ceramic foam may result in thickness uniformity, as discussed above. In some cases, a thickness gradient can be simulated to mimic, for example, an increased layer thickness on the lower portion of a solar panel when the solar panel is mounted at an inclined angle, for example, to catch incident solar energy. If the desired thickness has not been reached, the process may continue depositing sand (204). If the desired thickness has been reached, the process may end (210).

Figure 3:
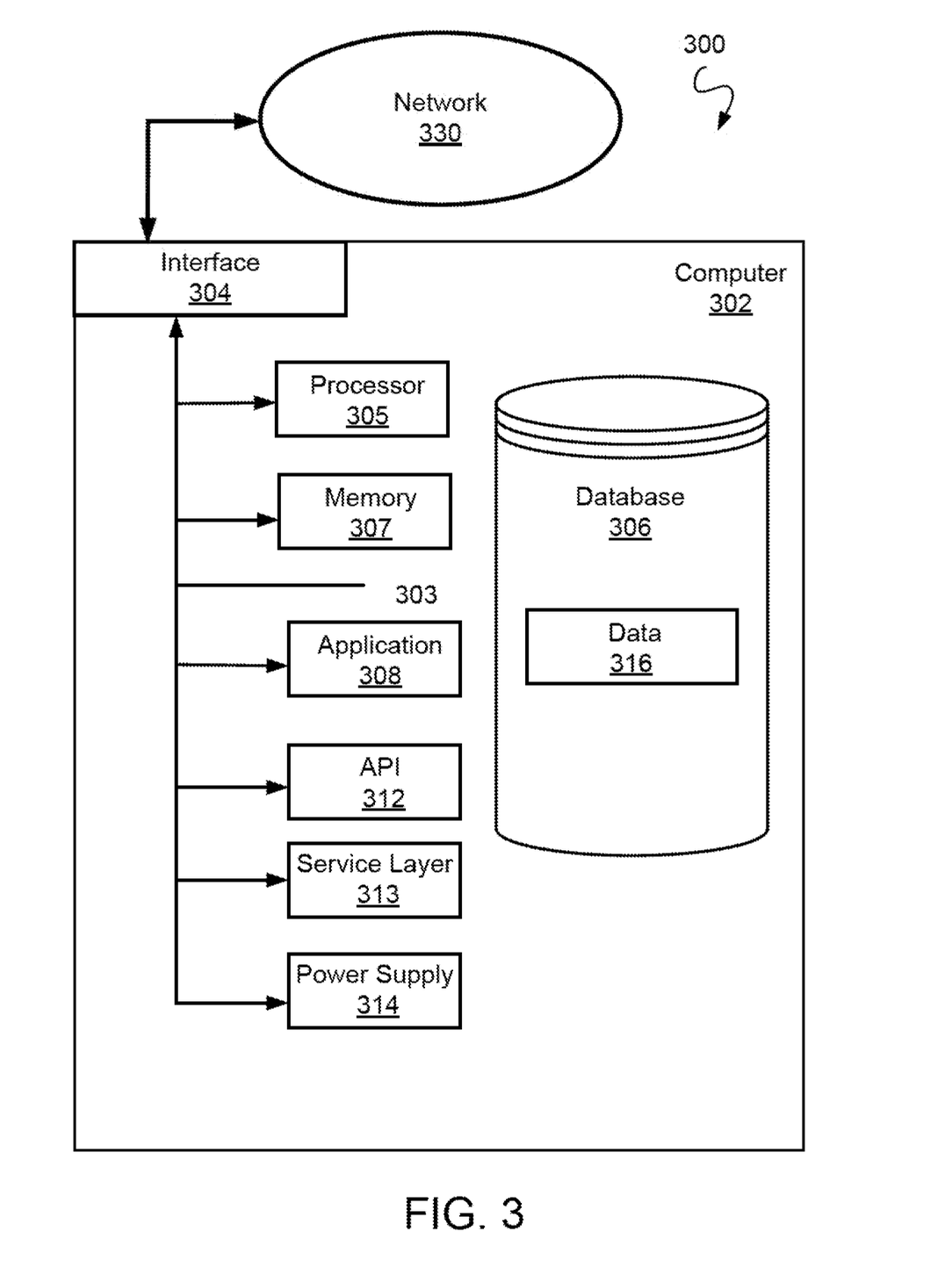
FIG. 3 is a block diagram illustrating an example of a computer system used to provide computational functionalities associated with described algorithms, methods, functions, processes, flows, and procedures, according to an implementation of the present disclosure.

FIG. 3 is a block diagram illustrating an example of a computer system 300 used to provide computational functionalities associated with described algorithms, methods, functions, processes, flows, and procedures, according to an implementation of the present disclosure. The illustrated computer 302 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 302 can comprise a computer that includes an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a computer system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

The computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users, external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and comprises logic encoded in software, hardware, or a combination of software and hardware. More specifically, the interface 304 can comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory, conventional, or another type of database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds the previously described data 316 including, for example, multiple streams of data from various sources, such as the temperature readings, humidity readings, deposit speed associate with a particular porous ceramic foam, and measured layer thickness.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system, comprising:
   at least one ceramic foam comprising a porous top surface, porous channels, and a porous bottom surface, wherein the at least one ceramic foam is positioned over a surface of a solar panel such that when dust particles are poured onto the porous top surface of the at least one ceramic foam, the dust particles permeate through the porous channels of the at least one ceramic foam and then exit from the porous bottom surface of the at least one ceramic foam to form a layer of dust, with a pre-determined thickness, on the surface of the solar panel.

2. The system of claim 1, wherein the porous channels are sized to have a diameter from about 2 mm to about 6 mm, and the pre-determined thickness is from about 20 micron to 500 micron.

3. The system of claim 1, wherein the surface of the solar panel comprises at least one of: a flat area, a curved area, or a mirror.

4. The system of claim 1, further comprising a stage, wherein the stage is motorized.

5. The system of claim 4, wherein the stage is configured to transport the at least one ceramic foam over the solar panel to deposit the dust particles over the surface of the solar panel.

6. The system of claim 4, wherein the stage is configured to transport the solar panel under the at least one ceramic foam such that the dust particles are deposited over the surface of the solar panel.

7. The system of claim 1, wherein the at least one ceramic foam comprises metal-oxides.

8. The system of claim 1, wherein the at least one ceramic foam further comprises at least one porous side surface.

9. The system of claim 8, further comprising: a shield surrounding the at least one porous side surface.

10. The system of claim 1, further comprising: at least one funnel structure arranged above the top porous surface of the ceramic foam, wherein the at least one funnel structure comprises at least one nozzle configured to pour the dust particles over the top porous surface of the ceramic foam.

11. The system of claim 1, further comprising a closed chamber that houses the solar panel, wherein the closed chamber is configured to control a temperature condition, a humidity condition, and a wind condition surrounding the solar panel.

12. A computer-implemented method, comprising:
    driving a stage to cause at least one ceramic foam to be positioned over a surface of a solar panel, wherein the at least one ceramic foam comprises a porous top surface, porous channels, and a porous bottom surface; and
    causing dust particles to be poured onto the porous top surface of the at least one ceramic foam such that the dust particles permeate through the porous channels of the at least one ceramic foam and then exit from the porous bottom surface of the at least one ceramic foam to form a layer of dust, with a pre-determined thickness, on the surface of the solar panel.

13. The computer-implemented method of claim 12, wherein the porous channels are sized to have a diameter from about 2 mm to about 6 mm, and the pre-determined thickness is from about 20 micron to 500 micron.

14. The computer-implemented method of claim 13, further comprising:
    using a feedback loop to control a thickness of the layer of dust being deposited.

15. The computer-implemented method of claim 12, wherein the surface of the solar panel comprises at least one of: a flat area, a curved area, or a mirror.

16. The computer-implemented method of claim 12, wherein driving the stage comprises: transporting the at least one ceramic foam over the solar panel to deposit the dust particles over the surface of the solar panel.

17. The computer-implemented method of claim 12, wherein driving the stage comprises: transporting the solar panel under the at least one ceramic foam such that the dust particles are deposited over the surface of the solar panel.

18. The computer-implemented method of claim 12, further comprising:
    using a feedback loop to control a temperature condition surrounding the solar panel.

19. The computer-implemented method of claim 12, further comprising:
    using a feedback loop to control a humidity condition surrounding the solar panel.

20. The computer-implemented method of claim 12, further comprising:
    using a feedback loop to control a wind condition surrounding the solar panel.

\* \* \* \* \*